United States Patent
Suda

(10) Patent No.: US 7,872,922 B2
(45) Date of Patent: Jan. 18, 2011

(54) MEMORY SYSTEM AND METHOD OF WRITING INTO NONVOLATILE SEMICONDUCTOR MEMORY

(75) Inventor: Takaya Suda, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 873 days.

(21) Appl. No.: 11/758,035

(22) Filed: Jun. 5, 2007

(65) Prior Publication Data

US 2007/0245181 A1 Oct. 18, 2007

Related U.S. Application Data

(63) Continuation of application No. PCT/JP2006/319828, filed on Sep. 27, 2006.

(30) Foreign Application Priority Data

Sep. 29, 2005 (JP) ............................. 2005-283388

(51) Int. Cl.
*G11C 11/34* (2006.01)
(52) U.S. Cl. ..................... 365/185.33; 365/189.16; 365/185.03; 365/189.11; 365/189.04
(58) Field of Classification Search ............ 365/233.11, 365/230.03, 185.11, 49.1, 185.23, 185.33, 365/230.08, 189.011, 189.04, 189.14, 189.16, 365/220
See application file for complete search history.

(56) References Cited

U.S. PATENT DOCUMENTS

| | | | |
|---|---|---|---|
| 6,363,009 B1 | 3/2002 | Fukuzumi | |
| 7,039,788 B1 | 5/2006 | Chang et al. | |
| 7,057,942 B2 | 6/2006 | Suda et al. | |
| 7,227,788 B2 | 6/2007 | Suda et al. | |
| 2004/0083348 A1* | 4/2004 | Chang et al. | ................. 711/202 |
| 2004/0213070 A1 | 10/2004 | Ueno | |
| 2005/0141313 A1 | 6/2005 | Gorobets et al. | |
| 2006/0004969 A1 | 1/2006 | Suda | |
| 2006/0047889 A1* | 3/2006 | Sasaki et al. | ................. 711/103 |
| 2007/0174550 A1* | 7/2007 | Maeda et al. | ................. 711/118 |

FOREIGN PATENT DOCUMENTS

| | | |
|---|---|---|
| CN | 1487530 A | 4/2004 |
| JP | 2001-306393 A | 11/2001 |
| JP | 2003-280822 | 10/2003 |
| JP | 2004-326538 A | 11/2004 |
| WO | WO 2004/040455 A2 | 5/2004 |
| WO | WO 2005/066792 A2 | 7/2005 |
| WO | WO 2005/106673 A1 | 11/2005 |

* cited by examiner

*Primary Examiner*—Pho M Luu
*Assistant Examiner*—Tha-O Bui
(74) *Attorney, Agent, or Firm*—Oblon, Spivak, McClelland, Maier & Neustadt, L.L.P.

(57) ABSTRACT

A memory system includes a nonvolatile semiconductor memory which includes a first original block composed of n (n being natural number) write unit areas and a first subblock composed of a plurality of write unit areas. A controller writes data having one of first to p-th (p being natural number smaller than n) addresses into the first original block. The controller writes data which has a first write address of one of the first to p-th addresses into the first subblock when the controller receives request to write data having the first write address and data having the first write address exists in the first original block.

18 Claims, 10 Drawing Sheets

| Pin No. | Signal |
|---|---|
| Pin 1 | Card detection/data 3 (DAT3) |
| Pin 2 | Command (CMD) |
| Pin 3 | Vss |
| Pin 4 | Vdd |
| Pin 5 | Clock (CLK) |
| Pin 6 | Vss |
| Pin 7 | Data 0 (DAT0) |
| Pin 8 | Data 1 (DAT1) |
| Pin 9 | Data 2 (DAT2) |

| | | |
|---|---|---|
| SD mode 4bit | DAT 3<br>DAT 2<br>DAT 1<br>DAT 0<br>CMD<br>CLK | CD/DATA<br>DATA<br>DATA<br>DATA<br>Command/response<br>Clock |
| SD mode 1bit | DAT 3<br>DAT 2<br>DAT 1<br>DAT 0<br>CMD<br>CLK | Reserved<br>No used<br>No used<br>DATA<br>Command/response<br>Clock |
| SPI mode | DAT 3<br>DAT 2<br>DAT 1<br>DAT 0<br>CMD<br>CLK | Chip select CS<br>No used<br>No used<br>DATA OUT<br>DATA IN<br>clock |

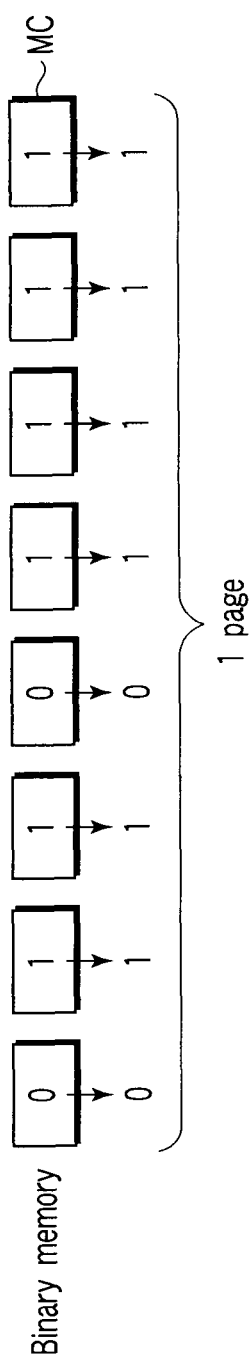
F I G. 14A
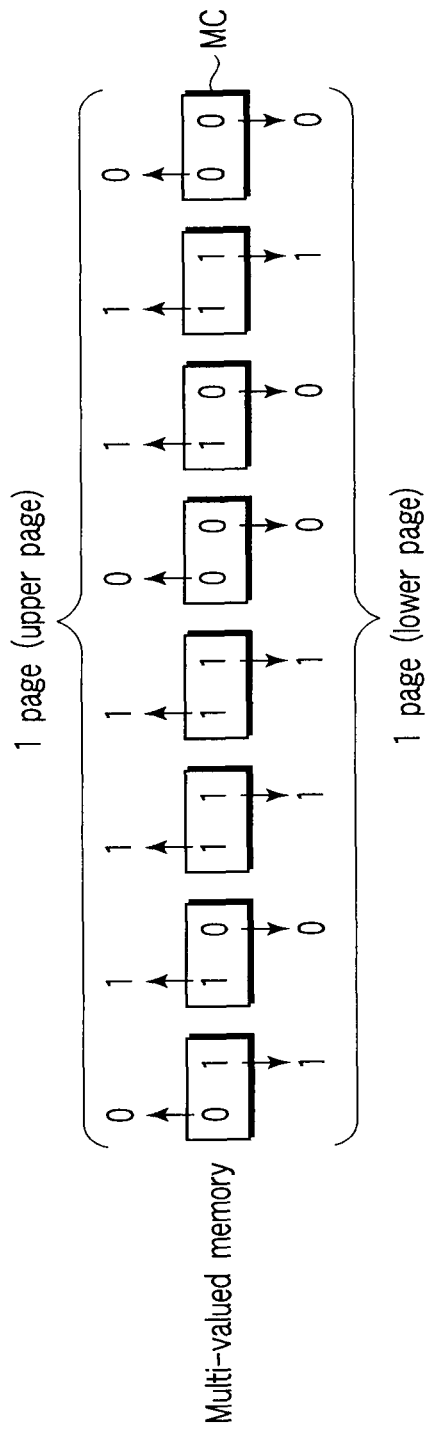
F I G. 14B

MEMORY SYSTEM AND METHOD OF WRITING INTO NONVOLATILE SEMICONDUCTOR MEMORY

CROSS-REFERENCE TO RELATED APPLICATIONS

This is a Continuation Application of PCT Application No. PCT/JP2006/319828, filed Sep. 27, 2006, which was published under PCT Article 21(2) in English.

This application is based upon and claims the benefit of priority from prior Japanese Patent Application No. 2005-283388, filed Sep. 29, 2005, the entire contents of which are incorporated herein by reference.

BACKGROUND OF THE INVENTION

1. Field of the Invention

The present invention relates to a memory system and a method of writing into a memory using a card controller, for example.

2. Description of the Related Art

A memory card having a nonvolatile semiconductor memory such as a flash memory is used as a medium for recording music data or video data. A typical example of a flash memory for use in a memory card includes a NAND type flash memory.

Data in a memory is managed in accordance with a write request from an application, etc., by a file system in a host device into which a memory card is inserted. The file system divides a file to be written into cluster sized pieces of data. The divided data each are assigned with a logical address, and the data are assigned to unassigned clusters in the order of a logical address. The memory card writes the data in the memory while managing the correspondence between a logical address of each data and a physical address for writing the data of the logical address on a table or the like realized on the memory.

When a file system of this type is used, management data such as FAT and information on a root directory entry as well as the written data are required to be updated upon writing of the data in the memory. The NAND type flash memory, however, has the features that (1) data is written page by page, (2) data is erased for each block which consists of a plurality of pages, and (3) the data cannot be written in a page which already holds data. For updating data by page, therefore, the process described below is executed by using an erased block. Specifically, data to be updated (new data) is written into a new block into which no data is written, and then, the remaining data not updated are copied to the new block from an old block containing old data (data to be rewritten into the new data). As a result, a considerable time may be required to update the data of each page.

As described above, the management data is updated frequently as the need arises each time of writing a file. For this reason, in the memory card using both the flash memory and the FAT file system, the data write or rewrite speed may be slow.

In order to avoid the reduction in write speed, management data of FAT file system may be written into a cache block (subblock) dedicated for storing data from lower address page to higher address page in the order of write request. The cache block is provided in addition to a block (original block) into which data of each logical address is to be originally written. With the arrival of a request to write given data, the data is written in the original block. Each time a request to update data already written in the original block arrives, the data is sequentially written in the subblock. In the process, the memory card prepares a correspondence table indicating into which page of the subblock the latest data of a given logical address is written.

The card reconstructs the original block at a predetermined timing. The reconstruction involves collecting the latest data of each logical address in the subblock into the original block with reference to the correspondence table.

However, the reconstruction of an original block poses the problem described below. Assume, for example, that a block B1 is an original block for storing data of addresses 0 to 5, as shown in FIG. 16. Each old data of addresses 0 to 5 is stored in the block B1, and each latest data of addresses 0 to 5 are stored in a subblock SB for the original block B1. When the original block for addresses 0 to 5 is reconstructed from this state, the following procedures are taken. First, an erased block B2 is prepared, and the latest data of address 0 is read from page 5 of the subblock and written into page 1 of the block B2.

Next, the latest data of address 1 is read from page 4 of the subblock, and written into page 2 of the block B2. By repeating this job, the latest data of addresses 0 to 5 are written into the block B2, as shown in FIG. 16. Finally, the block B2 is set as a corresponding original block for addresses 0 to 5.

For the purpose of executing the above-described process, the read and write processes are repeatedly executed as many times as the addresses assigned to one original block (six addresses in the shown example). During the reconstruction, the memory card continues to output a busy signal to the host device. If the busy signal is output for longer than the period of time set in the host device, the host device may determine that the memory card is in trouble. This problem becomes more conspicuous with the increase in page capacity due to the technological progress.

BRIEF SUMMARY OF THE INVENTION

According to an aspect of the present invention, there is provided a memory system comprising: a nonvolatile semiconductor memory including a first original block composed of n (n being natural number) write unit areas and a first subblock composed of a plurality of write unit areas; and a controller writing data having one of first to p-th (p being natural number smaller than n) addresses into the first original block, the controller writing data which has a first write address of one of the first to p-th addresses into the first subblock when the controller receives request to write data having the first write address and data having the first write address exists in the first original block.

According to an aspect of the present invention, there is provided a method of writing into a nonvolatile semiconductor memory, the memory including a first original block composed of n (n being natural number) write unit areas and a first subblock composed of a plurality of write unit areas, the method comprising: writing data having one of first to p-th (p being natural number smaller than n) addresses into the first original block, writing data which has a first write address of one of the first to p-th addresses into the first subblock when the controller receives request to write data having the first write address and data having the first write address exists in the first original block.

BRIEF DESCRIPTION OF THE SEVERAL VIEWS OF THE DRAWING

FIGS. 14A and 14B are diagrams schematically showing the storage condition of a binary memory and a multi-valued memory;

DETAILED DESCRIPTION OF THE INVENTION

Figures 1, 2:
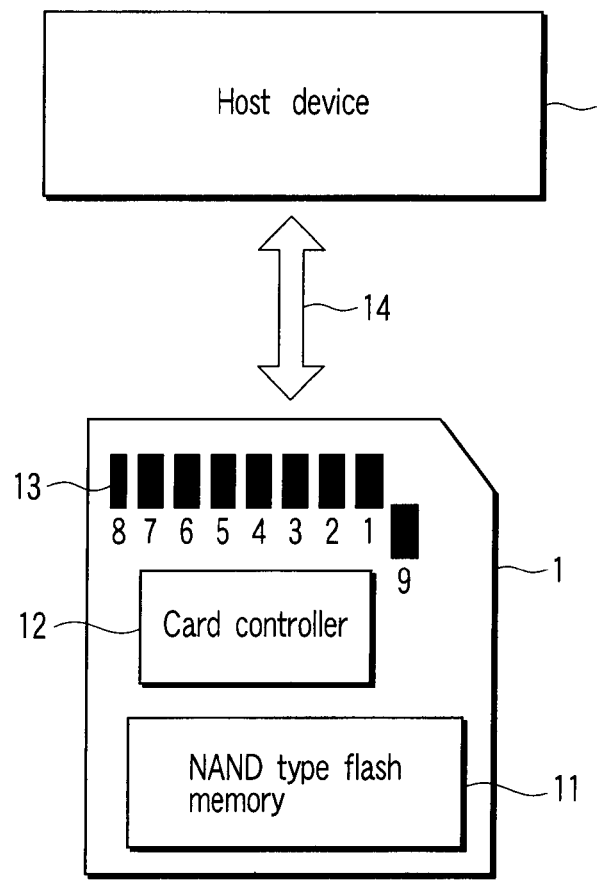
FIG. 1 is a schematic diagram showing a configuration of a memory card according to an embodiment of the present invention.
FIG. 2 is a diagram showing signal assignment to signal pins in the memory card according to the embodiment of the invention.

An embodiment of the invention will be explained below with reference to the drawings. In the following description, the components having substantially the same function and configuration are designated by the same reference numerals, respectively, and explained again only when necessary.

A memory system according to an embodiment of the invention will be explained below taking a memory card as an example.

FIG. 1 is a schematic diagram showing a configuration of a memory card according to an embodiment of the invention. The memory card 1 transmits and receives information to and from a host device 2 through a bus interface 14. The memory card 1 includes a NAND type flash memory (hereinafter referred to simply as a flash memory) chip 11, a card controller 12 for controlling the flash memory chip 11, and a plurality of signal pins (first to ninth pins) 13.

The signal pins 13 are electrically connected to the card controller 12. The first to ninth pins of the pins 13 each are assigned with a signal, for example, as shown in FIG. 2.

Data 0 to 3 are assigned to the seventh, eighth, ninth and first pins, respectively. The first pin is assigned also to a card detection signal. Further, the second pin is assigned to a command. The third and sixth pins are assigned to a grounding potential Vss, the fourth pin is assigned to a source potential Vd, and the fifth pin is assigned to a clock signal.

The memory card 1 is formed so as to be insertable into and removable from a slot formed in the host device 2. A host controller (not shown) arranged in the host device 2 communicates various signals and data with the card controller 12 in the memory card 1 through the first to ninth pins. For example, in writing data in the memory card 1, the host controller sends out a write command as a serial signal to the card controller 12 through the second pin. In the process, the card controller 12, in response to the clock signal supplied to the fifth pin, takes in the write command applied to the second pin.

As described above, the write command is serially input to the card controller 12 by using only the second pin. The second pin assigned to the command input is arranged between the first pin for the data 3 and the third pin for the grounding potential Vss, as shown in FIG. 2. The signal pins 13 and the bus interface 14 for them are used for communication between the host controller in the host device 2 and the memory card 1.

On the other hand, the communication between the flash memory 11 and the card controller 12 is conducted by an interface for the NAND type flash memory. Though not shown, therefore, the flash memory 11 and the card controller 12 are connected to each other by an 8-bit input/output (I/O) line.

For example, when writing data into the flash memory 11, the card controller 12 inputs a data input command 80H, a column address, a page address, data, and a program command 10H sequentially to the flash memory 11 through the I/O line. In the command 80H, "H" indicates the hexadecimal notation. Actually, the 8-bit signal "10000000" is applied in parallel to the 8-bit I/O line. In other words, a command of a plurality of bits is applied in parallel in the interface for the NAND type flash memory.

Also, in the interface for the NAND type flash memory, the command for the flash memory 11 and the data share the same I/O line for communication. In this way, the interface for communication between the host controller in the host device 2 and the memory card 1 is different from the interface for communication between the flash memory 11 and the card controller 12.

Figure 3:
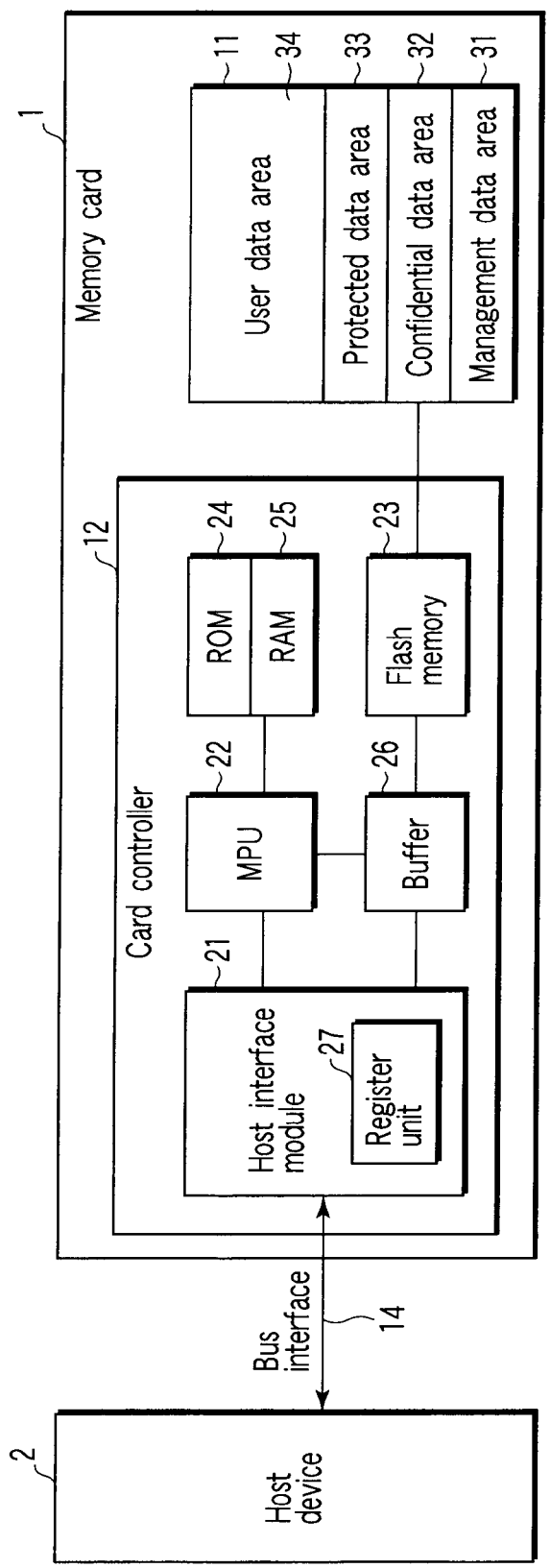
FIG. 3 is a block diagram showing a hardware configuration of the memory card according to the embodiment of the invention.

FIG. 3 is a block diagram showing a hardware configuration of the memory card according to the embodiment of the invention.

The host device 2 includes hardware and software for accessing the memory card 1 connected through the bus interface 14. The memory card 1, when connected to the host device 2, is supplied with power and operates, thereby executing the process corresponding to the access from the host device 2.

The memory card 1, as described above, includes the flash memory 11 and the card controller 12. The block size for erase (block size in erase unit) of the flash memory 11 is predetermined (256 kB, for example). Also, data are written into and read from the flash memory 11 in units called a page (2 kB, for example).

The card controller 12 manages the physical condition (for example, which physical block address contains which logical sector address data in the number of order or which block is erased) in the flash memory 11. The card controller 12 includes a host interface module 21, a micro processing unit (MPU) 22, a flash controller 23, a read-only memory (ROM) 24, a random access memory (RAM) 25, and a buffer 26.

Figure 4:
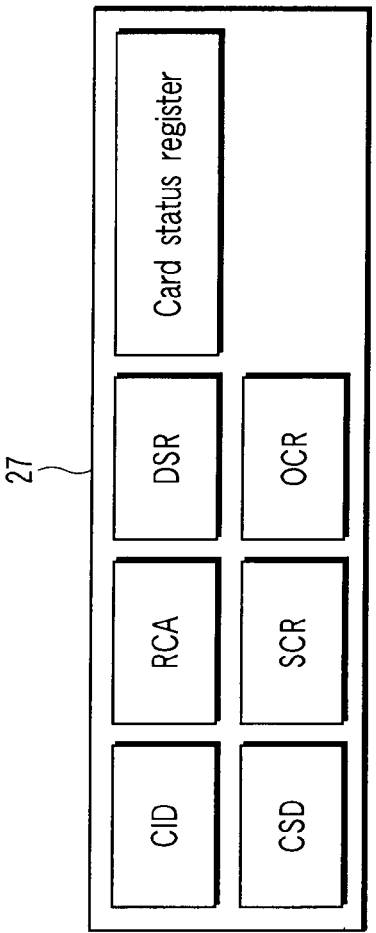
FIG. 4 is a diagram showing a detailed configuration of a register unit of the memory card according to the embodiment of the invention.

The host interface module 21 executes the process as an interface between the card controller 12 and the host device 2, and includes a register unit 27. FIG. 4 shows a detailed configuration of the register unit 27. The register unit 27 includes a card status register, and various registers such as a card identification number (CID), a relative card address (RCA), a driver stage register (DSR), card specific data (CSD), an SD configuration data register (SCR), and an operation condition register (OCR).

These registers are defined as described below. The card status register is used for the normal operation to store, example, error information described later. The CID, RCA, DSR, CSD, SCR and OCR are used mainly for initializing the memory card.

The CID stores the individual number of the memory card 1. The RCA stores a relative card address, which is dynamically determined by the host device at initialization. The DSR stores a bus drive power of the memory card 1, etc.

The CSD stores a characteristic parameter value of the memory card 1 and holds version information, a performance identification code and a performance parameter.

The SCR stores the data layout of the memory card 1. The OCR stores an operation voltage for the memory card limited in operation range voltage.

The MPU 22 controls the operation of the memory card 1 as a whole. For example, when power is supplied to the memory card 1, the MPU 22 reads a firmware (control program) stored in the ROM 24 onto the RAM 25 and executes a predetermined process thereby to prepare various tables on the RAM 25.

The MPU 22 also receives a write command, a read command and an erase command from the host device 2, and executes a predetermined process for the flash memory 11 or controls the data transfer process through the buffer 26.

The ROM 24 stores a control program for the control by the MPU 22. The RAM 25 is used as a work area of the MPU 22 and stores a control program and various tables. The flash controller 23 executes the process as an interface between the card controller 12 and the flash memory 11.

The buffer 26 temporarily stores a predetermined amount of data (one page, for example) in writing the data from the host device 2 into the flash memory 11 or sending out the data read from the flash memory 11 to the host device 2.

Figures 5, 6:
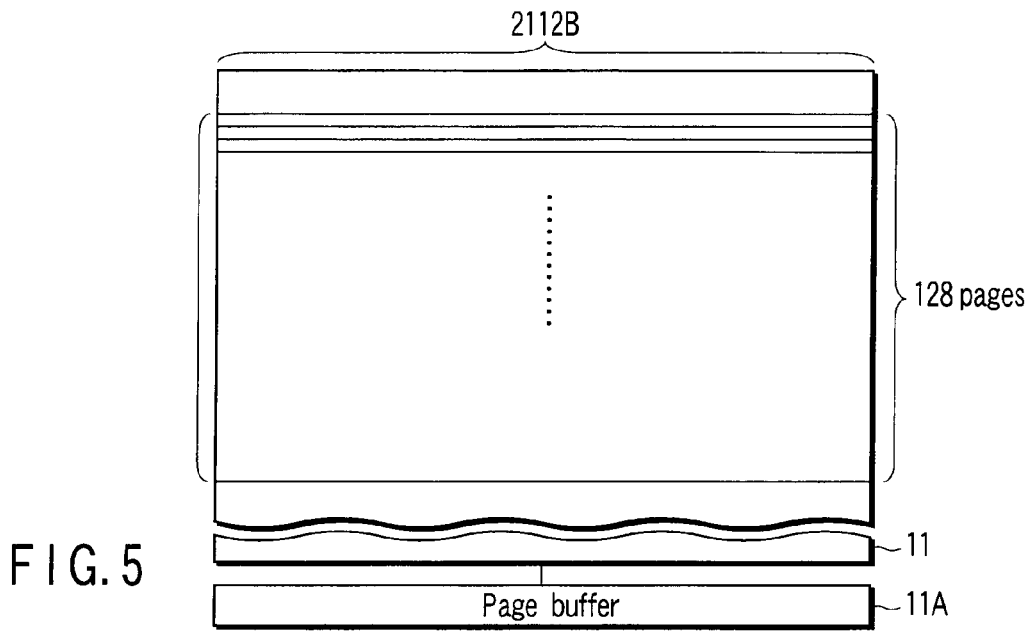
FIG. 5 is a diagram showing the structure of a buffer and a memory cell of a flash memory in the memory card according to the embodiment of the invention.
FIG. 6 is a diagram showing signal assignment to SD bus signal pins in each operation mode.

FIG. 5 shows the data layout in the flash memory 11 in the memory card 1. Each page of the flash memory 11 has 2112 B (512 B data storage unit×4+10 B redundant portion×4+24 B management data storage unit), and 128 pages, for example, constitute one erase unit (256 kB+8 kB (k: 1024)). In the following description, the erase unit of the flash memory 11 is set to 256 kB for the convenience sake.

Also, the flash memory 11 has a page buffer 11A for inputting/outputting data to and from the flash memory 11. The storage capacity of the page buffer 11A is 2112 B (2048 B+64 B). In writing data, the page buffer 11A inputs and outputs data to and from the flash memory 11 in units of one page corresponding to the storage capacity thereof.

If the storage capacity of the flash memory 11 is 1 G bit, the number of 256 kB blocks (erase unit) is 512.

Although FIG. 5 illustrates erase unit of 256 kB blocks, erase unit of 16 kB blocks is also practically effective. In this case, each page has 528 B (512 B data storage unit+16 B redundant portion), and 32 pages constitute one erase unit (16 kB+0.5 kB).

The area (data storage area) of the flash memory 11 where the data is written is, as shown in FIG. 3, divided into a some areas corresponding to the data to be held. The flash memory 11 includes a management data area 32, a confidential data area 32, a protected data area 33 and a user data area 34.

The management data area 31 mainly has stored therein management information on the memory card, i.e. security information of the memory card 1 and card information such as a media ID.

The confidential data area 32 stores key information for encryption and confidential data for authentication and is inaccessible from the host device 2.

The protected data area 33 stores important data, which can be accessible only after the legitimacy of the host device 2 is confirmed by mutual authentication with the host device 2 connected to the memory card 1.

The user data area 34 stores user data, and can be freely accessed and used by the user of the memory card 1.

Although this embodiment is explained with reference to a case in which the operation mode of the memory card 1 is an SD 4-bit mode, the invention is applicable also to an SD 1-bit mode and an SPI mode. FIG. 6 shows the signal assignment to the signal pins in the SD 4-bit mode, SD 1-bit mode and SPI mode.

The operation mode of the memory card 1 is roughly classified into an SD mode and an SPI mode. In the SD mode, the memory card 1 is set to the SD 4-bit mode or SD 1-bit mode by a bus width change command from the host device 2.

Take note of four data, i.e. data 0 pin (DAT0) to data 3 pin (DAT3). In the SD 4-bit mode for transferring data in units of 4-bit width, the four pins including the data 0 to data 3 pins are all used for data transfer.

In the SD 1-bit mode for transferring data in units of 1-bit width, only the data 0 pin (DAT0) is used for data transfer, while the data 1 pin (DAT1) and the data 2 pin (DAT2) are not used at all. Also, the data 3 pin (DAT3) is used for asynchronous interruption from, for example, the memory card 19 to the host device 2.

In the SPI mode, the data 0 pin (DAT0) is used for a data signal line (DATA OUT) from the memory card 1 to the host device 2. The command pin (CMD) is used for a data signal line (DATA IN) from the host device 2 to the memory card 19. The data 1 pin (DAT1) and the data 2 pin (DAT2) are not used at all. Also, in the SPI mode, the data 3 pin (DAT3) is used for transmission of a chip select signal CS from the host device 2 to the memory card 1.

The host device 2 has mounted a file system thereon. The file system manages a file (data) recorded in a memory and includes a management area and management information in the memory. The file system also defines how to prepare directory information such as a file and a folder in a memory, how to move or delete the file and the folder, a data recording system, and information on where the management area exits and how to use it.

Figure 7:
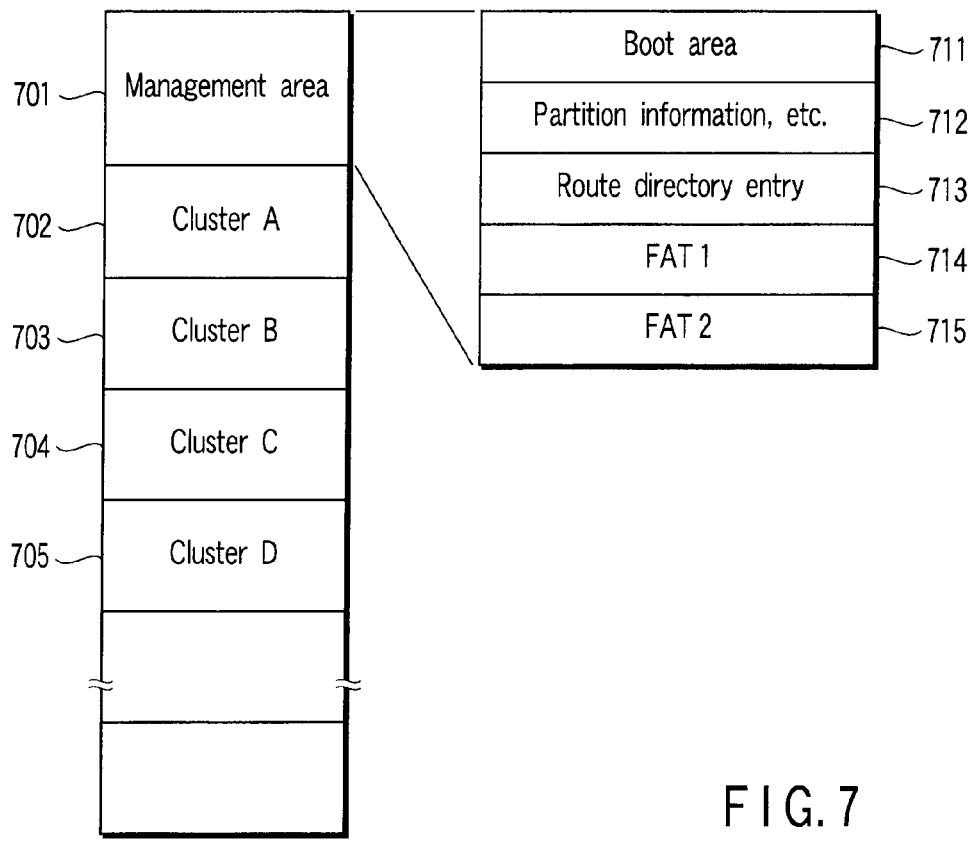
FIG. 7 is a diagram showing a configuration of a FAT file system.

FIG. 7 shows an example of a file allocation table (FAT) file system of 16 kBytes in cluster size. The file system is configured of a management area 701 and a plurality of clusters A, B, C and D (702 to 705). The file system management area 701 includes, for example, a boot area 711 for storing boot information, an area 712 for storing partition information etc., a root directory entry area 713 for storing information of a root directory entry, and a FAT1, a FAT2 (714, 715).

Assume, for example, that with the clusters A and C used, a file having a name of "AAA.txt" and 32 kBytes in file size is written in a storage unit. The size of this file is larger than the cluster size, and therefore, the file is divided into units of clusters and stored in vacant clusters of the storage unit. Specifically, since the size of the file to be written is 32 kBytes, the file is written by using two clusters. The clusters are not required to be continuous, and therefore, the file is stored by using, for example, the clusters B and D. Each data configuring one file is normally assigned with a continuous logical address. For this reason, even when the file system assigns each data configuring a file to a cluster not continuous in address, the logical address assigned to each data is continuous.

Management data for indicating into which cluster the file to be written is stored in the FAT1 and FAT2. The FAT1 and FAT2 store the same data. When one FAT becomes defective, the data can be repaired by using the other one. The FAT1 and FAT2 store information on the clusters assigned to the file and the relation of the link of the clusters in the storage unit. By tracing the information stored in the FAT1 and FAT2, the original file can be restored.

In this case, the first 16 kBytes of the divided file are stored in the cluster B, and the last 16 kBytes are stored in the cluster D. For this reason, the FAT1 and FAT2 store information indicating that the cluster D should be linked next to the cluster B. In reading the file divided into two clusters, the data are serially connected as shown in the FAT1 and FAT2 to restore the original file.

The root directory entry area 713 stores a file name or a folder name, a file size, an attribute and a file update date and time as well as a flag indicating which cluster indicated in the FAT1 and FAT2 is a head cluster of the file. In the example under explanation, the information stored in the root directory entry area 713 has the file name "AAA.txt", the file size of 32 kBytes, and the cluster B as the head cluster.

Figure 8:
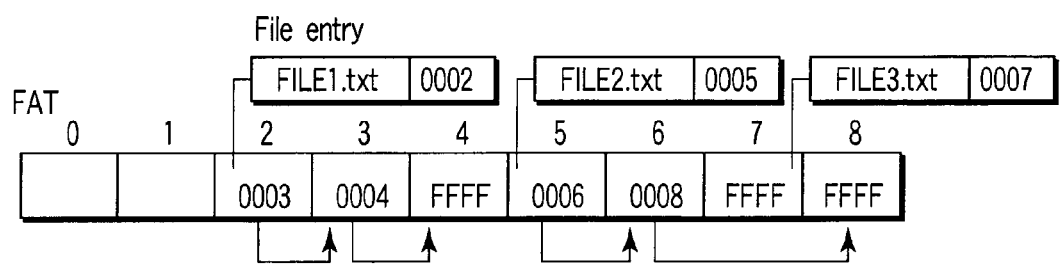
FIG. 8 is a diagram showing an example of data in a FAT and a root directory entry.

FIG. 8 shows an example of the data in the FAT1, FAT2 and the root directory entry. As shown in FIG. 8, information on position of the head cluster of each of the files "FILE1.txt", "FILE2.txt" and "FILE3.txt" are shown as a file entry in the root directory area. The head clusters of "FILE1.txt", "FILE2.txt" and "FILE3.txt" are clusters 0002, 0005 and 0007, respectively.

The FAT (FAT1, FAT2) shows the cluster number to be connected next to each cluster. In the example of "FILE1.txt", a cluster 0003 stores data that follows data stored in the head cluster 0002 and a cluster 0004 stores data that follows data stored in the cluster 0003. Connecting the data of clusters 0002, 0003 and 0004 provides the restored "FILE1.txt" file.

Figure 9:
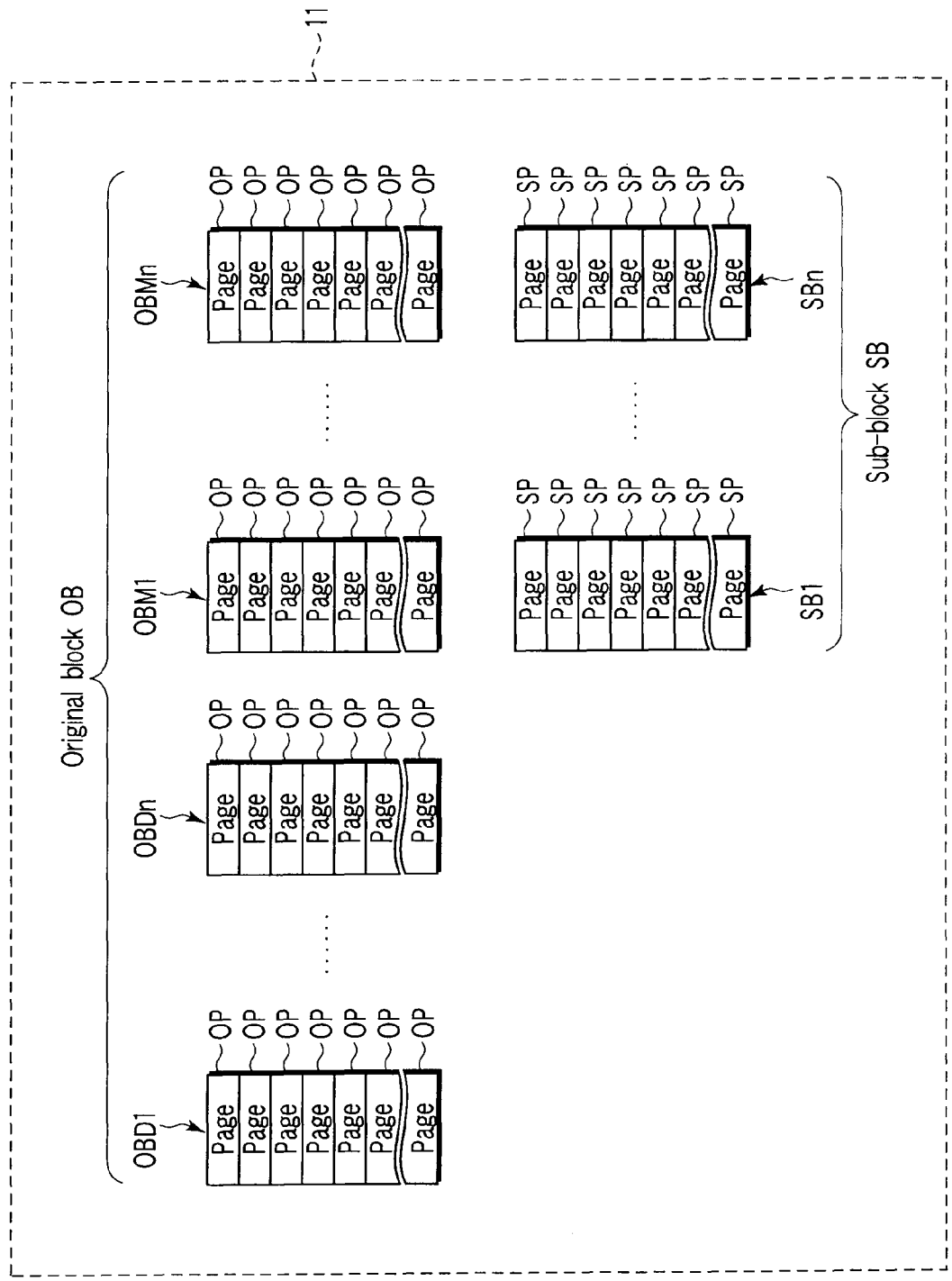
FIG. 9 is a diagram showing a configuration of a memory of the memory card according to the embodiment of the invention.

FIG. 9 shows a configuration of a memory of the memory card according to the embodiment of the invention. As shown in FIG. 9, the user data area 11 includes an original block OB for normal data storage and a subblock (cache block) SB. The blocks OB, SB correspond to the erase unit of the flash memory. Data of logical addresses continuous over a predetermined range are to be written in a single original block OB in the order of their logical address. This rule is applied to make read operation efficient by collecting data that may be continuously read into one block. Each original block OB has pages OP and each subblock SB has pages SP.

Generally, data are written in the original block OB in the order of logical address from the page of the lower physical address toward the page OP of higher physical address.

The original block OB includes original blocks OBD1 to OBDn for data and original blocks OBM1 to OBMn for management data. The original blocks OBD1 to OBDn for data store real data configuring the file (hereinafter referred to simply as data), and the original blocks OBM1 to OBMn for management data store management data such as FAT.

The original blocks OBD1 to OBDn for data are to store as many data as the pages contained in the original blocks OBD1 to OBDn. When one block is configured of 128 pages, a maximum of 128 data of continuous addresses are written in the original blocks for data.

On the other hand, the original blocks OBM1 to OBMn for management data store fewer management data than the pages contained in the original blocks OBM1 to OBMn. A plurality of original blocks OBM for management data are used to store n data (n being number of pages contained in one block, for example, 128). Assume, for example, that the number of pages of one original block OBM for management data is 128. The data of several addresses out of the 128 addresses are, then, stored in one original block OBM for management data, while the data of the remainder of the 128 addresses are stored in another original block OBM for management data.

When, for example, two original blocks OBM for management data are used to store the management data, the first original block for management data stores data of logical addresses $A_0$ to $A_p$ of logical addresses $A_0$ to $A_n$, where p is a natural number less than n. The second original block for management data stores data of the logical addresses $A_{p+1}$ to $A_n$. As a most typical example, each original block for management data stores data of addresses for one half of the number of pages included in one original block. As a result, unused pages exist in each original block for management data. A plurality of logical addresses to be assorted into the same original block for management data is hereinafter referred to as a group.

In a similar way, when three original blocks OBM for management data are used to store the management data, the first original block for management data stores data of logical addresses $A_0$ to $A_p$ of logical addresses $A_0$ to $A_n$. The second original block for management data stores data of the logical addresses $A_{p+1}$ to $A_q$, where q is natural number not less than (p+1) but less than n. The third original block for management data stores data of the logical addresses $A_{q+1}$ to $A_n$. The similar rule is applied when four or more original blocks OBM for management data are used.

Also, subblocks (cache blocks) SB1 to SBn are provided for the original blocks OBM1 to OBMn for management data. In each subblock SB, data to be written in the original block OBM for management data corresponding to each subblock SB are written into the highest physical address page one after another in regardless of their logical address.

Figure 10:
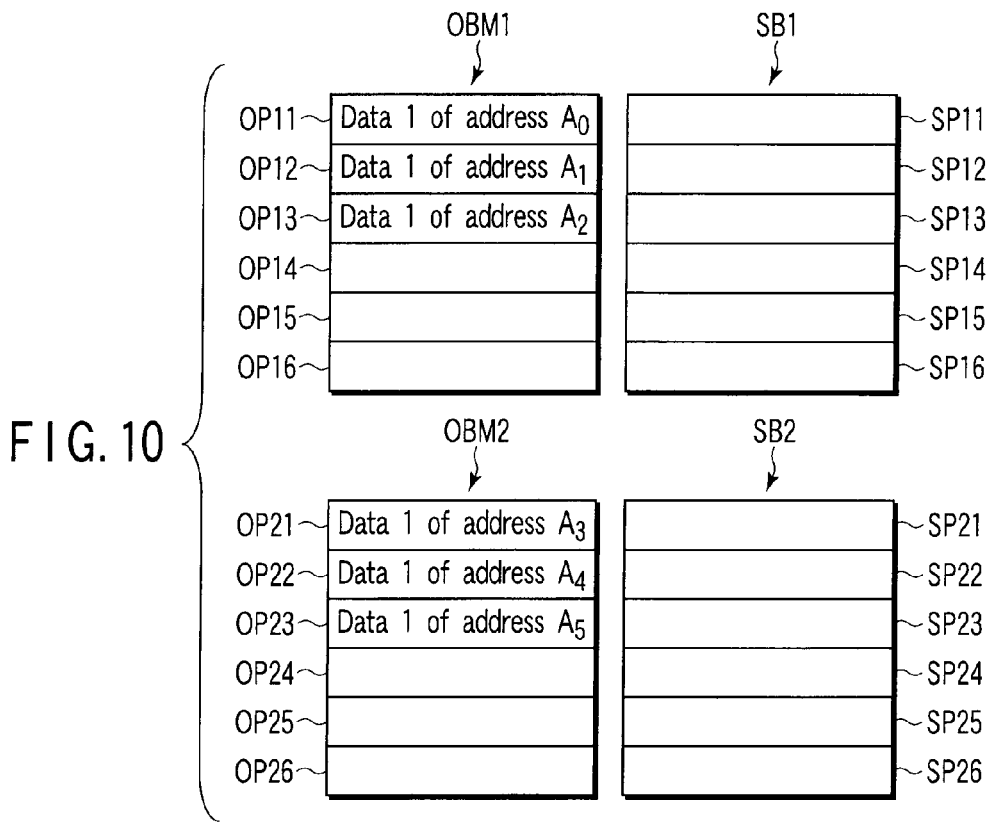
FIGS. 10, 11, 12 and 13 are diagrams and a flow chart for explaining a method of writing into the memory card according to the embodiment of the invention.
Figure 11:
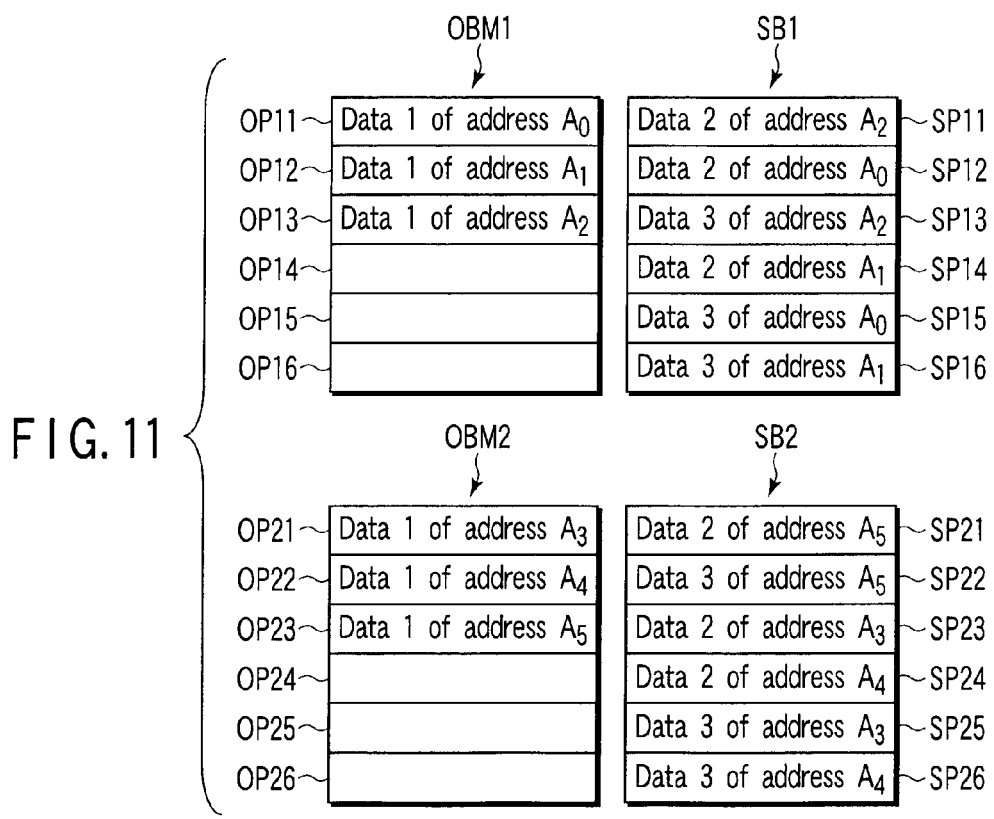
Figure 12:
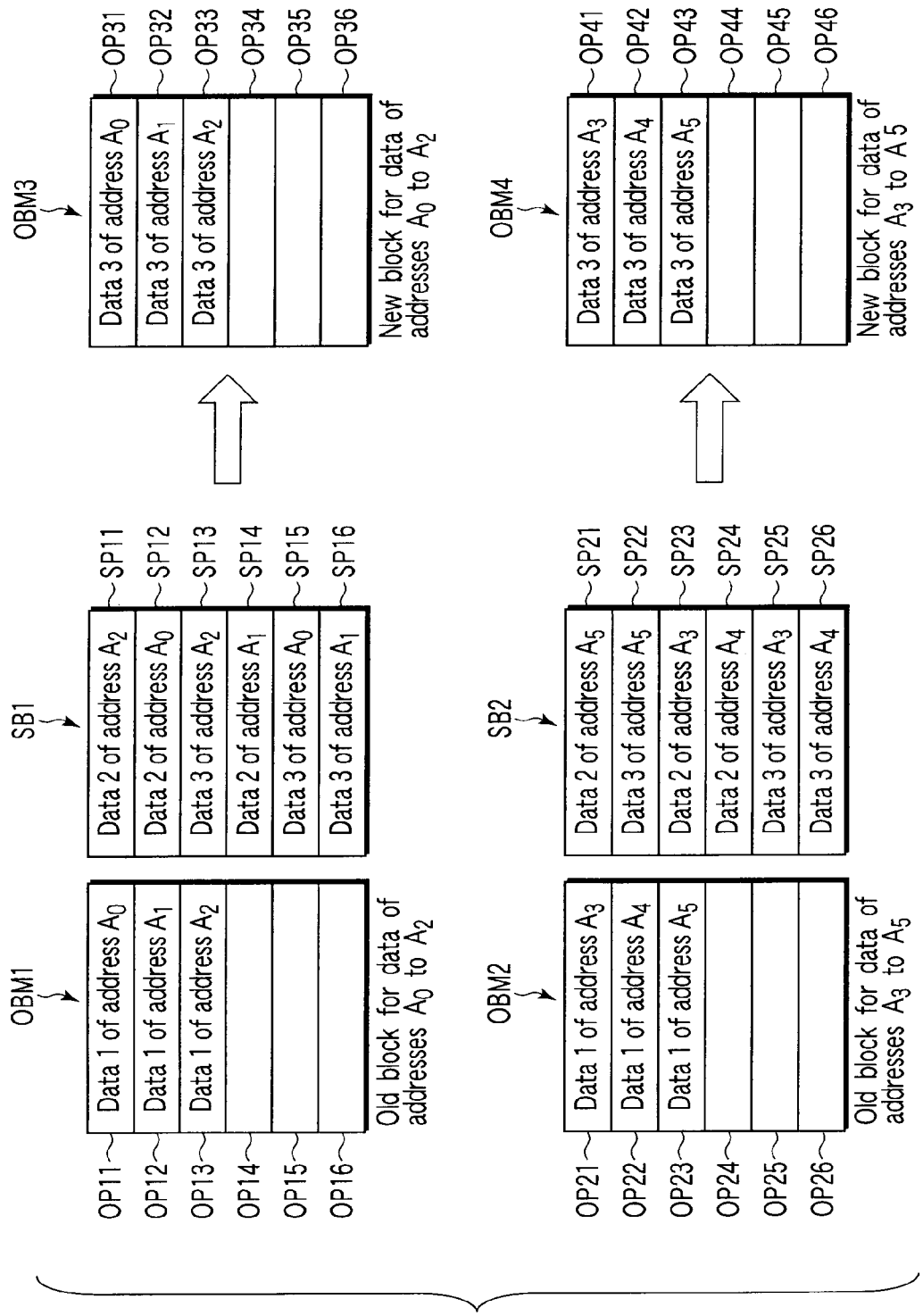
Figure 13:
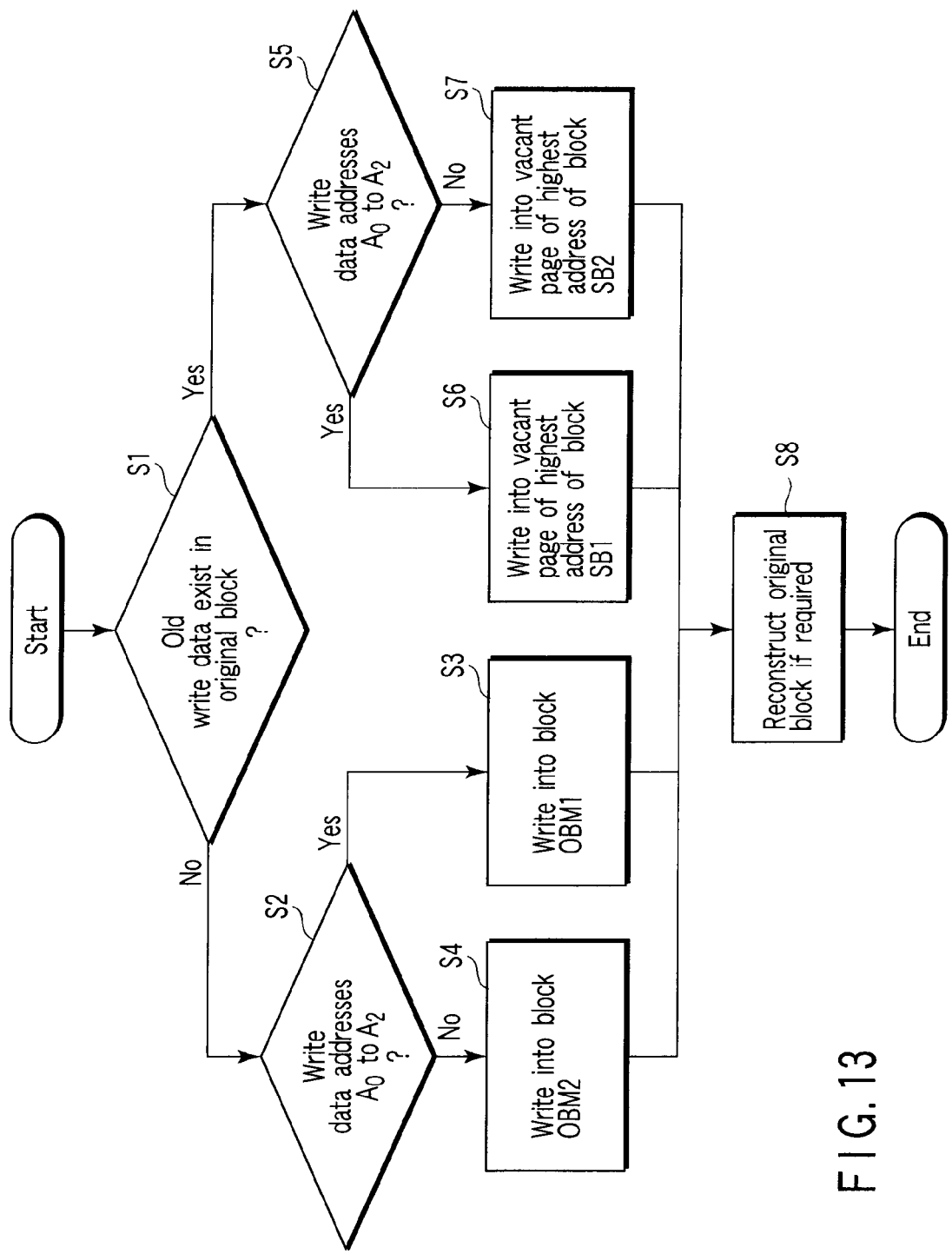

Next, a method of writing into the memory card having the above-mentioned configuration will be explained with reference to FIGS. 10 to 13. FIGS. 10, 11 and 12 are diagrams for explaining a method of writing into the memory card according to the embodiment of the invention. FIG. 13 is a flowchart showing the write operation into the memory card in response to one write request according to the embodiment of the invention.

The card controller 12 writes data into the flash memory 11 according to the method described below. Specifically, the card controller 12 writes data into the flash memory 11 according to the method described later, while at the same time managing the correspondence between a logical address of data of which a write request is received from the host device 2 and a physical address at which the data of the logical address is to be written, by means of a correspondence table realized on a RAM, for example.

In an example shown in FIG. 10, each original block OB includes six pages and the card controller 11 operates so that each original block OBM for management data stores data of three addresses or one half of six addresses for the simplified explanation.

First, the management data of the addresses $A_0, A_1, A_2$ are sequentially written in the pages OP11, OP12 and OP13 of the original block OBM1 for management data dedicated to store the management data of the addresses $A_0, A_1, A_2$ in response to a first write request. Specifically, it is determined whether or not there exists the original block for management data in which the management data of the addresses $A_0, A_1, A_2$ are written (step S1). In the absence of such an original block for management data, an address of management data (write data) associated with the write request is determined (step S2). If the address is any one of $A_0, A_1$ and $A_2$, the process proceeds to step S3.

In step S3, the management data of the address $A_0$ is written in the erased block OBM1. Using the original block OBM1 for management data as a block for storing the management data of the addresses $A_0, A_1$ and $A_2$, the management data associated with the first write request for the addresses $A_1$ and $A_2$ belonging to the same group as the address $A_0$ are subsequently written in the original block OBM1. Specifically, if the determination in step S1 is "false" and the determination in step S2 is "true", the write data is written in the original block OBM1 for management data. The pages OP14, OP15 and OP16 are not used.

The management data of the addresses $A_3$, $A_4$ and $A_5$, on the other hand, are sequentially written, in response to the first write request, in the pages OP21, OP22 and OP23 of the original block OBM2 for management data dedicated to store the management data of the addresses $A_3$, $A_4$ and $A_5$. Specifically, if the determinations in steps S1 and S2 are both "false", the process proceeds to step S4.

In step S4, the management data of the address $A_3$ is written in the erased block OBM2. The original block OBM2 for management data is used as a block dedicated to store the management data of the addresses $A_3$, $A_4$ and $A_5$ and the management data associated with the first write request for the addresses $A_4$ and $A_5$ belonging to the same group as the address $A_3$ are subsequently written in the original block OBM2. Specifically, in the case where the determinations in both steps S1 and S2 are "false", the write data is written in the original block OBM2 for management data. The pages OP24, OP25 and OP26 are not used.

Upon receipt of an update request for the management data of any one of the logical addresses $A_0$, $A_1$ and $A_2$ written in the original block OBM1 for management data, the management data is written in the subblock SB1 regardless of the their logical address, as shown in FIG. 11. Specifically, if the determination is "true" in step S1, the process proceeds to step S5. In step S5, the address of the write data is determined. If the address is any one of $A_0$, $A_1$ and $A_2$, the write data is written in the order of arrival of the write request from the page SP11 toward the page SP16 of the subblock SB1 (step S6).

In a similar way, upon receipt of an update request for the management data of any one of the logical addresses $A_3$, $A_4$ and $A_5$ written in the original block OBM2 for management data, the management data is written in the subblock SB2 regardless of the logical address. Specifically, if the determination is "true" in step S1 and "false" in step S5, the write data is written in the order of arrival of the write request from the page SP21 toward the page SP26 of the subblock SB2 (step S7).

Next, as shown in FIG. 12, the original block for management data of the addresses $A_0$, $A_1$ and $A_2$ is reconstructed by using the latest management data of each logical address in the subblock SB1 at a predetermined timing such as when the subblock SB1 is filled up (step S8). Specifically, the erased original block OBM3 for management data is prepared, and the latest management data of the logical addresses $A_0$, $A_1$ and $A_2$ are sequentially copied to the original block OBM3 for management data in the order of the logical address, i.e. in the pages OP31, OP32 and OP33 in that order.

Then, the correspondence table is rewritten to show that the logical addresses $A_0$, $A_1$ and $A_2$ correspond to the pages OP31, OP32 and OP33, respectively, of the management data block OBM3 which stores the management data of logical addresses $A_0$, $A_1$ and $A_2$. The data in the management data block OBM1 are subsequently erased at a predetermined timing.

The data read/write cycle required for reconstruction of one original block coincides with the number of addresses assigned to be stored in one original block. According to the present embodiment, each original block OBM for management data consists of n pages and is assigned less than n addresses. For this reason, the read/write cycle for reconstructing one original block OBM for management data is less than n.

A similar process is executed also for the subblock SB2. Specifically, an erased original block OBM4 for management data is prepared, and the latest management data of the logical addresses $A_3$, $A_4$ and $A_5$ are sequentially copied to the pages OP41, OP42 and OP43, respectively, of the original block OBM4 for management data. Then, the correspondence table is rewritten in such a manner that the logical addresses $A_3$, $A_4$ and $A_5$ and the pages OP41, OP42 and OP43 of the management data block OBM4 for storing the management data of the logical addresses $A_3$, $A_4$ and $A_5$ correspond to each other.

Figure 15A:
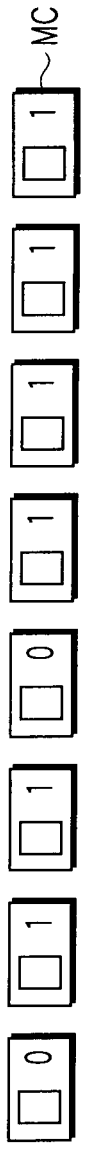
FIGS. 15A and 15B are diagrams schematically showing the storage condition in a binary mode of a multi-valued memory.
Figure 15B:
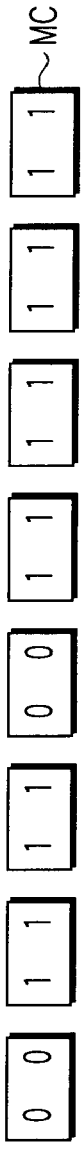
Figure 16:
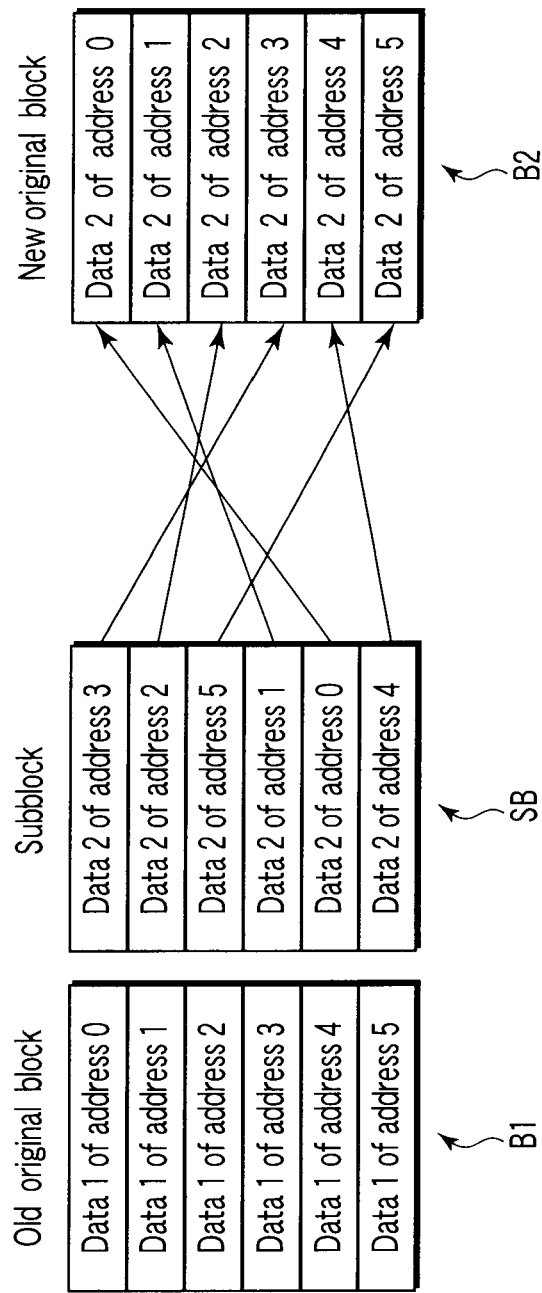
FIG. 16 is a diagram for explaining a conventional method of writing into a memory card.

When the memory cell of the flash memory 11 can record multi-valued (multi-bits such as 2 bits) information, the method described below can be employed. Specifically, the management data are written in the memory cell of the original block OBM for management data in the multi-valued information and are written in the subblock SB by the method called a binary mode. This method will be explained below with reference to FIGS. 14A, 14B, 15A and 15B. FIGS. 14A and 14B are diagrams schematically showing how data are stored in the binary memory and the multi-valued memory. FIGS. 15A and 15B are diagrams schematically showing how data are stored in binary mode of the multi-valued memory.

The NAND type flash memory can be classified into the binary memory and the multi-valued memory. As shown in FIG. 14A, only 1-bit data of logic "0" or "1" is stored in one memory cell MC of the binary memory. In the multi-valued memory, on the other hand, 2-bit data, can be stored in one memory cell MC as shown in FIG. 14B.

Upon receipt of a write request for 8-bit data like "01101111" in a binary memory, for example, each of eight memory cells MC having continuous physical addresses stores one bit of the 8-bit data, and one page address is assigned to the cluster of the 8 bits.

With the multi-valued memory, on the other hand, for example, each of the memory cells stores 2-bit data, and each of the bits is assigned with a different page address. For example, the cluster of the most significant bits of each memory cell MC is assigned with one page address, and the cluster of the least significant bits is assigned with one page address. The page assigned to the cluster of the most significant bits is called, for example, an upper page, and the page assigned to the cluster of the least significant bits is called, for example, a lower page.

When 2-bit data is written in one memory cell MC of the multi-valued memory, two write operations are performed. In other words, the data are separately written in the lower page address and the upper page address.

The current rule of writing into the multi-valued memory may permit the writing into the upper page after writing into the lower page, and may prohibit the writing into the lower page after writing into the upper page. According to this rule, in the case where some trouble (such as an instantaneous power failure) occurs and the storage in the memory cell MC is destroyed at writing into the lower page, only the data to be written into the lower page is destroyed since no data is written into the upper page.

If the writing into the upper page fails and the data in the memory cell is destroyed, however, the data already written into the lower page is also destroyed. The destroyed data are not generally left in the flash memory 11, or if left, only in the host device 2. Accordingly, unless the data are transferred again from the host device 2 (though undesirably), the whole data in the flash memory 11 would be lost.

As described above, the management data such as FAT are required to restore the data divided into clusters to the original file. Once the management data are destroyed, therefore, the original file cannot be restored.

Thus, in writing the management data into the subblock SB, the multi-valued memory cell is used as a binary memory cell. By doing so, although the storage capacity per memory cell is reduced as compared with the write operation of multi-valued data, the management data of the lower page already written is prevented from being destroyed when writing into the upper page. This writing method is called, for example, "binary mode".

FIGS. 15A and 15B show how to use the multi-valued memory cell as a binary memory cell in two ways. In one method, data are written only in one of the upper and lower pages (FIG. 15A). The other method consists in writing the same data in both the upper and lower pages (FIG. 15B). In both methods, only the data of the lower or upper page (1-bit data) is written in one memory cell. For this reason, when the data fails to be written, the data already written is prevented from being destroyed.

In the memory cells of the original block OB for management data, like in the original block OBD for data, the multi-valued data are stored (the data are written in the multi-valued mode) but no data are written in the binary mode for the reason described below. That is, the data are written in the multi-valued mode in the memory cells MC of the original block OB for management data, and therefore, the data of the lower page may be destroyed due to the failure to write the data of the upper page at reconstruction or the like. Even in that case, however, the destroyed data of the lower page of the original block OB for management data is stored in the subblock SB. As a result, even when the data of the upper page fails to be written in the original block OB for management data, the management data are not completely lost.

With the memory card according to the embodiment of the invention, the original block for management data stores the data of the addresses fewer than the n, which is number of the pages included in the original block for storing the management data, and more than two management blocks for management data store management data of n addresses. Thus, the number of the read/write cycles for reconstructing one original block OBM for management data is less than n.

The total amount of time required to copy all the latest management data of each address in the subblock SB to an original block OBM for management data is constant regardless of the number of addresses assigned to one original block for management data. At least according to this embodiment, however, the time required for one reconstruction session is shorter than in the case where as many addresses as the pages included in the original block OBM for management data are assigned to each original block OBM for management data. For this reason, the sustained time of the busy signal for reconstruction is prevented from exceeding a predefined time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
   a nonvolatile semiconductor memory including a first physical original block and a second physical original block both comprising n (n being natural number) write unit areas, and a first physical subblock and second physical subblock both comprising a plurality of write unit areas; and
   a controller which:
      writes data having one of first to p-th (p being natural number smaller than n) logical addresses into the first physical original block and data having one of (p+1)-th to m-th (m being natural number not smaller than p+2 and not larger than n) logical addresses into the second physical original block,
      writes, when the controller receives a request to write data which has one of the first to p-th logical addresses and exists in the first physical original block, the write-request-target data into a write unit area of the first physical subblock having a physical address which follows a physical address of a write unit area of the first physical subblock which stores the data written lastly in the first physical subblock and which is followed by a physical address of a write unit area which stores no data,
      writes, when the controller receives a request to write data which has one of the (p+1)-th to m-th logical addresses and exists in the second physical original block, the write-request-target data into a write unit area of the second physical subblock having a physical address which follows a physical address of a write unit area of the second physical subblock which stores the data written lastly in the second physical subblock and which is followed by a physical address of a write unit area which stores no data.

2. The memory system according to claim 1, wherein
   the memory further includes a third physical original block comprising n write unit areas,
   the controller writes a latest one of each of data which have the first to p-th addresses and are stored in the first physical subblock into the third physical original block.

3. The memory system according to claim 1, wherein
   the data to be written into the first physical original block include information for managing real data to be written into the memory.

4. The memory system according to claim 1, wherein
   the controller:
   writes write data into the first physical original block from the write unit area of lower physical address toward the write unit area of higher physical address in the order of a logical address of the write data; and
   writes write data into the first physical subblock from the write unit area of lower physical address toward the write unit area of higher physical address regardless of the logical address of the write data.

5. The memory system according to claim 1, wherein
   each of memory cells of the first physical original block stores multi-bit data.

6. The memory system according to claim 1, wherein
   each of memory cells of the memory stores multi-bit data, and
   the controller writes one-bit information into the memory cells of the first physical subblock.

7. The memory system according to claim 6, wherein
   a plurality of physical addresses are assigned to each of the memory cells of the first physical subblock, and one-bit information is written into one of the plurality of physical addresses in each of the memory cells of the first physical subblock.

8. The memory system according to claim 1, wherein
the memory further includes a third physical original block comprising n write unit areas, and
the third physical original block stores a plurality of real data which have continuous n logical addresses.

9. The memory system according to claim 8, wherein
each of memory cells of the third physical original block stores multi-bit data.

10. A method of writing into a nonvolatile semiconductor memory, the memory including a first physical original block and a second physical original block both comprising n (n being natural number) write unit areas and a first physical subblock and a second physical subblock both comprising a plurality of write unit areas, the method comprising:
writing data having one of first to p-th (p being natural number smaller than n) logical addresses into the first physical original block and data having one of (p+1)-th to m-th (m being natural number not smaller than p+2 and not larger than n) logical addresses into the second physical original block;
writing, when a request to write data which has one of the first to p-th logical addresses and exists in the first physical original block is received, the write-request-target data into a write unit area of the first physical subblock having a physical address which follows a physical address of a write unit area of the first physical subblock which stores the data written lastly in the first physical subblock and which is followed by a physical address of a write unit area which stores no data; and
writing, when a request to write data which has one of the (p+1)-th to m-th logical addresses and exists in the second physical original block is received, the write-request-target data into a write unit area of the second physical subblock having a physical address which follows a physical address of a write unit area of the second physical subblock which stores the data written lastly in the second physical subblock and which is followed by a physical address of a write unit area which stores no data.

11. The method according to claim 10, wherein
the memory further includes a third physical original block comprising n write unit areas, and
the method further comprises writing a latest one of each of data which have the first to p-th addresses and are stored in the first physical subblock into the third physical original block.

12. The method according to claim 10, wherein
the data to be written into the first physical original block include information for managing real data to be written into the memory.

13. The method according to claim 10, wherein
write data is written into the first physical original block from the write unit area of lower physical address toward the write unit area of higher physical address in the order of a logical address of the write data, and
write data are written into the first physical subblock from the write unit area of lower physical address toward the write unit area of higher physical address regardless of the logical address of the write data.

14. The method according to claim 10, wherein
memory cells of the first physical original block store multi-bit data.

15. The method according to claim 10, wherein
memory cells of the memory store multi-bit data, and
one-bit information are written into the memory cells of the first physical subblock.

16. The method according to claim 15, wherein
a plurality of physical addresses are assigned to each of the memory cells of the first physical subblock, and
one-bit information is written into one of the plurality of physical addresses in each of the memory cells of the first physical subblock.

17. The method according to claim 10, wherein
the memory further includes a third physical original block comprising n write unit areas, and
the third physical original block stores a plurality of real data which have continuous n logical addresses.

18. The method according to claim 17, wherein
memory cells of the third physical original block store multi-bit data.

* * * * *